US010625166B2

(12) United States Patent
Aityan et al.

(10) Patent No.: US 10,625,166 B2
(45) Date of Patent: Apr. 21, 2020

(54) SLIDING LOOP GAME WITH MOVE CONSTRAINTS

(71) Applicants: Sergey K. Aityan, Oakland, CA (US); Romans Seleznovs, Athenry (IE)

(72) Inventors: Sergey K. Aityan, Oakland, CA (US); Romans Seleznovs, Athenry (IE)

( * ) Notice: Subject to any disclaimer, the term of this patent is extended or adjusted under 35 U.S.C. 154(b) by 61 days.

(21) Appl. No.: 15/991,661

(22) Filed: May 29, 2018

(65) Prior Publication Data

US 2019/0366218 A1   Dec. 5, 2019

(51) Int. Cl.
*A63F 9/06* (2006.01)
*A63F 13/822* (2014.01)
*A63F 13/69* (2014.01)

(52) U.S. Cl.
CPC ............ *A63F 13/822* (2014.09); *A63F 13/69* (2014.09); *A63F 2300/1075* (2013.01); *A63F 2300/609* (2013.01); *A63F 2300/807* (2013.01)

(58) Field of Classification Search
None
See application file for complete search history.

(56) References Cited

U.S. PATENT DOCUMENTS

| | | | | |
|---|---|---|---|---|
| 448,019 A * | 3/1891 | Garben | ................ | G09B 19/02 434/209 |
| 507,215 A * | 10/1893 | Churchill | ............... | A63F 9/0826 273/153 S |
| 631,737 A * | 8/1899 | Compton | ............... | A63F 9/0826 273/153 S |
| 3,222,072 A * | 12/1965 | Dreyer | ................... | A63F 9/088 273/157 R |
| 4,509,756 A * | 4/1985 | Moscovich | ........... | A63F 9/0823 273/153 S |
| 4,735,417 A * | 4/1988 | Gould | .................. | A63F 9/0819 273/153 S |
| 5,135,225 A * | 8/1992 | Pszotka | ................. | A63F 9/0823 273/153 S |
| 5,622,368 A * | 4/1997 | Chang | .................. | A63F 9/0807 273/153 S |
| 5,836,584 A * | 11/1998 | Chen | ..................... | A63F 9/0857 273/153 S |
| 8,393,623 B2 * | 3/2013 | Storer | .................... | A63F 9/088 273/156 |

* cited by examiner

*Primary Examiner* — Sunit Pandya

(57) ABSTRACT

A sliding loop game with move constraints includes a playing field formed by intersecting strings and loops. Each loop is a self-connected chain of sites. Each string consists of a chain of sites. Both ends of a string are virtually connected in a loop via invisible connecting sites. Each site is occupied by a game object specifically marked by a color, pattern, character or characters, number, image, or any other identifying marks. Game objects in a loop or a string are moveable as a whole group along the respective sites in the loop or string. If the game object at the end-site of a string leaves the string, it reappears in the end-side at the other end of the string. Movement constraints are applied to the game objects by using master game objects. Hints on target positions of game objects and allowed movements directions are indicated on the playing field.

4 Claims, 15 Drawing Sheets

Loops are formed as a self-connected sequence of sites.

A Loop (a)

A Loop (b)

Intersection of loops with multiple joint sites
(a)

Intersection of loops with a single joint site
(b)

(a)      (b)      (c)      (d)

A loop with game objects marked with colors and numbers (a)

A loop with game objects marked with colors and images (b)

(a) (b) (c) (d) (e)

(f) (g) (h) (i)

SLIDING LOOP GAME WITH MOVE CONSTRAINTS

BACKGROUND OF THE INVENTION

Field of the Invention

The present invention generally relates to puzzle- and sliding-type games and, more particularly, is concerned with a sliding cyclic motion computer, electronic, or mechanical games by employing cyclic moves of the selected groups of game objects on the sites of playing fields with various geometry displayed on a computer monitor or mobile device screen, or in a mechanical device to reposition the game objects on the sites of the game field from an initial pattern to a final target pattern with certain motion constraints applied to the game objects.

Description of the Prior Art

Computer games are played on a variety of electronic devices, including computer systems, workstations, desktops, laptops, tablets, mobile devices, and smartphones, and other stationary and portable electronic devices. A computer game is provided in the form of a software program typically stored or installed on the electronic device or run on the electronic device from the external drive, from a network or the internet with the software program run on a single computer, a client machine, a server, servers, or a cloud. During operation of the software program, images on the monitor of the player show changes in the images in response to actuation of the input device by the player. In fact, many puzzle-type and sliding-type games have already been implemented as computer games. Mechanical games are played on a variety of physical devices that provide the appropriate mechanical functionality.

Examples of several puzzle computer games are disclosed in U.S. Pat. No. 5,296,845 to Hallet, U.S. Pat. No. 5,312,113 to Ta-Hsien et al., U.S. Pat. No. 7,815,190 B1 to Krisch and Hinchley, U.S. Pat. No. 5,643,085 to Aityan and Lysyansky, U.S. Pat. No. 7,243,918 to Vernon, U.S. Pat. No. 7,494,125 to Nesis, U.S. Pat. No. 7,063,322 to Safar, and U.S. Pat. No. 7,918,730 to Brosnan et al.

The Haller patent (U.S. Pat. No. 5,296,845) discloses a computer system employing left and right keyboards used with a software program for playing games or solving puzzles. The software program causes generation of a plurality of partial pictures randomly arranged in a grid of columns and rows on the screen of a display monitor. The left keyboard has a rectangular pattern of keys used for direct exchange of the positions occupied by two of the partial pictures. The direct exchange is carried out by depressing any two keys on the left keyboard. The exchanged partial pictures can be located within any of the columns or rows. The right keyboard has a pair of keys designating "yes" and "no" functions for moving the displayed picture column by column either left or right and a pair of keys designating "+" and "−" functions for turning a selected partial picture in either a clockwise direction or counterclockwise direction by 90.degree for each depression of the appropriate key.

The Ta-Hwien et al patent (U.S. Pat. No. 5,312,113) discloses a video puzzle cube game in which a plurality of keys are used to drive a computer game software program to show a hexahedron pattern having six sides. Each side of the pattern is divided into nine equal divisions. Each division is further divided into nine blanks filled with or for filling with squares.

The Krisch and Hinchley patent (U.S. Pat. No. 7,815,190) discloses A jigsaw puzzle has a blank and computer-printable face. The jigsaw puzzle has a thick substrate which forms a thick substrate sheet. The thick substrate sheet has been die-cut, into thick puzzle pieces. The thick puzzle pieces are joined together by uncut lands between the thick puzzle pieces. The cuts and said lands are in such proportions as to allow users to separate the thick puzzle pieces from each other. The thick substrate is at least 0.020" thick.

The Vernon patent (U.S. Pat. No. 7,243,918) discloses an extension for a rotatable puzzle piece that is used with a sliding puzzle, and a sliding puzzle that uses the same. In one aspect the puzzle has an extension for a rotatable puzzle piece, comprising a housing including a backing frame and a front member connected one to the other. The backing frame is formed with a fixedly disposed first recess defined by walls formed on the backing frame. A fixedly disposed second recess is defined by the front member. The puzzle also includes a plurality of puzzle pieces disposed in the second recess, wherein each of the pieces is individually movable by sliding it in the second recess, whereby the pieces are movable so as to be arranged in a desired solution in the second recess. A channel operatively communicates with the second recess such that the pieces can be moved into the channel and rotated therein, thereby rotationally reorienting the pieces. The rotationally reoriented pieces can be moved into the second recess in an attempt to solve the puzzle.

The Aityan and Lysyansky patent (U.S. Pat. No. 5,643,085) discloses a two-dimensional cyclic game for creating and implementing puzzles and the like includes a two-dimensional playing field of either planar or curved configurations, a plurality of fixed sites defined on the playing field, and a plurality of game objects occupying the fixed sites. The game objects are movable only in groups. The groups are repositionable through performance of a series of consecutive moves to restore the game objects on the sites to a desired pattern. Also, in each of the moves, the game objects in a selected one of the groups are cyclically moved simultaneously in a given direction through translation or rotation along an endless cyclic path. In each cyclic translational move, the game objects of the selected one group are moved such that one of the game objects of the selected group located adjacent to a first portion of the playing field border is moved off the field at the first portion thereof and back onto the playing field at a second portion of the playing field border. In each cyclic rotational move, each of the game objects of the selected one of the groups remains on the same one of the playing field sites and rotates thereon through a portion of a complete rotation cycle.

The Vernon patent (U.S. Pat. No. 7,243,918) discloses an extension for a rotatable puzzle piece that is used with a sliding puzzle, and a sliding puzzle that uses the same. In one aspect the puzzle has an extension for a rotatable puzzle piece, comprising a housing including a backing frame and a front member connected one to the other. The backing frame is formed with a fixedly disposed first recess defined by walls formed on the backing frame. A fixedly disposed second recess is defined by the front member. The puzzle also includes a plurality of puzzle pieces disposed in the second recess, wherein each of the pieces is individually slidably movable in the second recess, whereby the pieces are movable so as to be arranged in a desired solution in the second recess. A channel operatively communicates with the second recess such that the pieces can be moved into the channel and rotated therein, thereby rotationally reorienting the pieces. The rotationally reoriented pieces can be moved into the second recess in an attempt to solve the puzzle.

The Nesis patent (U.S. Pat. No. 7,494,125) discloses a sliding tile puzzle in which a series of rectangular tiles having exposed upper surfaces marked with indicia are packed together in a square planar array for lateral sliding movement in the planar array into a vacant space to change the relative positions of the tiles in the array thereby altering the indicia sequence. Tile turntables are mounted in four corners of the array so that tiles can be slid laterally thereon and are connected by gears to a handle shaft which extends perpendicularly below the array and which can be pushed axially upwards and twisted to raise the corner tiles above the plane of the array and rotate them for return to the array in a changed angular position. Upward movement of the shaft also raised a locking plate into engagement with adjacent tiles to prevent movement thereof.

The Safar patent (U.S. Pat. No. 7,063,322) discloses the puzzle apparatus of the present invention presents a challenging logic-based puzzle wherein the user attempts to arrange tiles within one or more chambers until a particular predetermined pattern is achieved (the solution). The apparatus and game play methodology of the present invention differs from that in the prior art in that as the tiles are slid from one matrix column to another the moved tile covers the existing tile located in the matrix column the moving tile is being traveling toward, while the matrix column the moving tile is exiting replaces the moving tile with one located directly underneath it in the matrix column thereby cause a new, unknown tile to replace the moving tile. This added dimension makes it very challenging to arrange the tiles to display a predetermined pattern and achieve the solution. The major elements consist of rigid housing creating a matrix of columns (also referred to as chambers), each chamber containing a base piece attached to a compression spring, multiple sliding tiles, and retaining buttons. The slidable and stackable tiles are interchangeable and relatively arrangeable to produce a solution to the puzzle. The solution includes a predetermined pattern as viewable by the user when looking generally toward the opening of the housing. A method for solving a puzzle in accordance with the invention is also provided.

The Brosnan et al patent (U.S. Pat. No. 7,918,730) discloses trajectory-based games of chance are described that may be implemented on a video gaming machine. In a trajectory based game of chance, a trajectory of a game object may be generated in a 3-D gaming environment. A Wager may be made on an aspect of the game object's trajectory in the gaming environment such as a termination location for the trajectory of the game object. The aspect of the game object's trajectory may occur according to a knoWn probability. Hence, an aWard for the trajectory-based game of chance may be proportional to the probability of the aspect of the game object's trajectory occurring.

The above-identified patents appear to represent steps in the right direction for implementing puzzle-type games as computer or mechanical games. However, these patents appear to provide approaches which are too limited in the variety of moves allowed and in their degree of difficulty to be successful in transforming mechanical puzzle-type games into enjoyable computer game puzzles and in creating new puzzle-type computer games. For example, one of the most popular mechanical puzzle games is a game well-known as Rubik's Cube. The puzzle game consists of twenty-seven small cubes which are color identified and are combined in a manner to form a large cube and permit the rotation of each of the six faces of the large cube in order to change the respective locations of each of the small cubes relative to one another in order to arrive at a desired pattern or arrangement. Another popular mechanical puzzle game is known as Fifteen Bars by Lloyd. It has an enclosed frame with sixteen spaces in a four-by-four grid and fifteen square bars occupying fifteen of the spaces, leaving one space open. The bars can be moved in orthogonal directions such that any one of the bars bordering the one open space can be moved into that one space leaving its previous position as the new open space. It is unlikely that these mechanical puzzle games could be implemented nor that many new puzzle-type games could be created merely by employing the approaches of the above-described patents.

Consequently, a need still exists for the next step in the family of geometric-topological games to develop spatial imagination of the players. The next generation games should offer a broad spectrum of complexities, from easy games for children through quite complex for players with high level of educational and spatial vision. Those games should combine educational purpose with entertainment and require a different approach to implement and create a wider variety of puzzles as computer or mechanical games.

BRIEF SUMMARY OF THE INVENTION

The present invention provides a sliding loop game designed to satisfy the need in intellectual geometric and topological games of variable complexity. The sliding loop game allows for sliding cyclic translational or other moves of game objects, which form a geometric loop or a string, as a group. A string is an open sequence of sites; thus each string has two ends. A loop is a sequence of sites connected in a loop; thus a loop has no ends. Each site is occupied by a game object. Game objects are marked by colors, characters, patterns, numbers, or images, full or partial. Game objects are different or identical. All game objects in a string or a loop are movable by sliding along the respected string or loop as a group. Both ends of each string are virtually and invisible connected in a loop, thus a sliding move of the game objects in each string works in the same way as in loops. It means that a game object at one end of a string, if moved out of the string, reappears on the other side of the string.

The playing field of the game is composed of various numbers of loops and/or strings of various length and shapes, as well as with variously marked game objects that allows to form a variety of games of different complexity By performing sliding moves of the game objects along the strings and loops the player changes the configuration of the game objects in the playing field. The goal of the game is to bring the entire configuration of the game objects to a required target configuration.

A sliding loop game with constrained moves allows moves only for the game objects specially marked as "master game objects" or allows moves only in the strings or loops that include master objects.

BRIEF DESCRIPTION OF DRAWINGS

FIGS. 1 and 2 are respective views of loops and strings. Loops are of a regular circle shape (FIG. 1(a)) as well as of any shape (FIG. 1(b)) as an explicitly self-connected chain of sites. Strings are chains of sequentially connected sites of any shape as shown in FIG. 2 (a), (b), and (c). One end of a string (the end-site in the string) is logically connected to the other end of the sting (the end-site at the other end of the string) as illustrated in the figure. There are none, one, or many hidden connecting sites in another dimension for any string to connect both ends of a string in a virtual loop as illustrated in FIG. 2(d, e). The connecting sites are not explicitly belong to the respective string, and hence, are not explicitly shown in the string. The strings illustrated in FIG. 2(a, b, c) do not have hidden connecting sites.

FIGS. 3 through 6 illustrate examples of joint sites, which are the sites located in the intersections between strings, loops, and strings with loops.

FIGS. 7 through 9 illustrate examples of game objects which occupy the respective sites by keeping their own shape and size or adjusting their shape and size to the shape and size of the occupied sites. Game objects are marked with color, characters, patterns, numbers, images or fragments of images. The hidden connecting sites in the strings do not explicitly belong to the strings.

FIG. 10 provides examples of playing fields as (a) a straight string, (b) a curved string, (c and i) a rectangular combination of horizontal and vertical strings, (d) combination of two horizontal and two vertical strings, (e) a combination of a horizontal and angled strings, (f) a loop, (g) a combination of two loops, (h) a combination of two strings with a loop. The game objects in (a), (b), (c), and (g) are marked with colors and patterns, the game objects in (d), (e), and (h) are marked with numbers, and the game objects in (f) and (i) are marked with images. Hidden connecting sites, which connect string into virtual loops do not belong to the playing field and for this reason are not shown in the playing field.

FIGS. 11 through 21 provide examples of respective views of moves of the game objects in the playing fields of various configurations. FIG. 11 illustrates the role of the hidden connected sites of the respective strings in the sliding motion of the game objects along the respective strings.

FIG. 22 presents examples of a respective view of regular game objects versus master game objects. Master game objects are specifically marked. In a move constrained game, game objects are movable as a whole group of game objects in a particular string or loop only, if that respective string or loop contains at least one master game object.

FIGS. 23 through 27 provide examples of moves in the move-constrained sliding loop game, where the game objects in a string or in a loop in the playing field are movable only, if that particular string or loop contains at least one master game object.

FIG. 26 illustrates the allowed move paths determined by the positions of the master game objects "5" and "15" in the playing field. The allowed move paths change with the changes of the master game objects positions in the playing field. For example, master game objects "5" and "15" in the positions shown in FIG. 27(a) allow only a vertical move up-or-down by any number of steps along the "3-6-9-12-15-18" (right vertical) string, a vertical move up-or-down along the "2-5-8-11-14-17" (middle vertical) string, a horizontal move left-or-right along the "4-5-6" (second from the top horizontal) string, and a horizontal move left-or-right along the "13-14-15" (second from the bottom horizontal) string. In FIG. 27 (b), after a 1-step left move was made from the previous position in the horizontal string "13-14-15, the allowed move paths for the next move are along the middle vertical string "2-5-8-11-15-17", because both master game objects "5" and "15" belong to that string, and along two horizontal strings "4-5-6" with master game object "5" and "14-15-13" with master game object "15". FIG. 27 (c) shows the positions of the game objects resulted from the previous move, the allowed paths for the next move are along the vertical string "15-17-2-5-8-11" because both master game objects "5" and "15" belong to that string and along two horizontal strings "1-15-3" with master game object "15" and "10-5-12" with master game object "5".

FIG. 27 illustrates the allowed move paths, which are determined by the position of master game object "15" in the playing field. In the position of the game objects shown in FIG. 26(a), the allowed move paths are clockwise and counterclockwise along the loop "3-20-21-22-23-24-25-26-7-19-18-17-11-16-15-14" because master game object "15" belongs to that loop. As a 2-step clockwise move was performed along that loop, the new position of the game objects is shown in FIG. 26(b). In this position of the game objects, there are two allowed paths for the next move in the playing field. One path is along the same loop as in previous position and another allowed path is along the vertical string "1-2-15-4-5-6-25-8-9". Suppose a vertical 1-step up move was performed along that string, the next position of the game objects is shown in FIG. 26(c). This position allows for the next move only along the vertical string "2-15-4-5-6-25-8-9-1" because the master game object "15" belongs to this string only and does not belong to the loop.

FIG. 28 illustrates the allowed move paths determined by the positions of the master game objects with directional constraints in the playing field. Master game object "5" allows only a move to the right and master game object "12" allows a move upward. The allowed move paths are only horizontally to the right along string "4-5-6" because master game object "5" belongs to that string and allows only a move to the right and vertically up along string "3-6-9-12-15" because master game object "12" belongs to that string and allow only move upward. Vertical moves in both directions and a horizontal left move of master game object "5" as well as a vertical move down and horizontal moves in both directions of master game object "12" are not permitted due to the directional constraints.

FIGS. 29 and 30 illustrate hints placed on the sites in the playing field that indicates whether the current position of game objects on those sites match or do not match the target position of the game objects in the playing field.

FIG. 31 provides an example of the allowed move paths indicators to provide visual hints on allowed move directions, which depend on the positions of the master game objects in the playing field.

DETAILED DESCRIPTION OF THE INVENTION

Devices

The sliding loop game with move constraints is implemented as a software program that runs on a stand-alone or connected to a network or cloud electronic devices, computer systems, or portable or mobile systems or devices. The sliding loop game can be also implemented on other electronic or mechanical device.

Strings, Loops, and Sites

Figure 1:
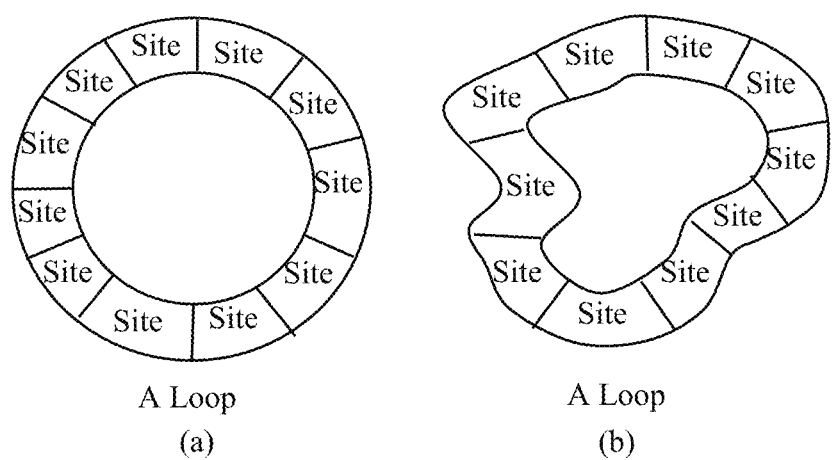
FIG. 1: Examples of loops—(a) a circular loop; (b) a loop of an arbitrary shape.
Figure 2:
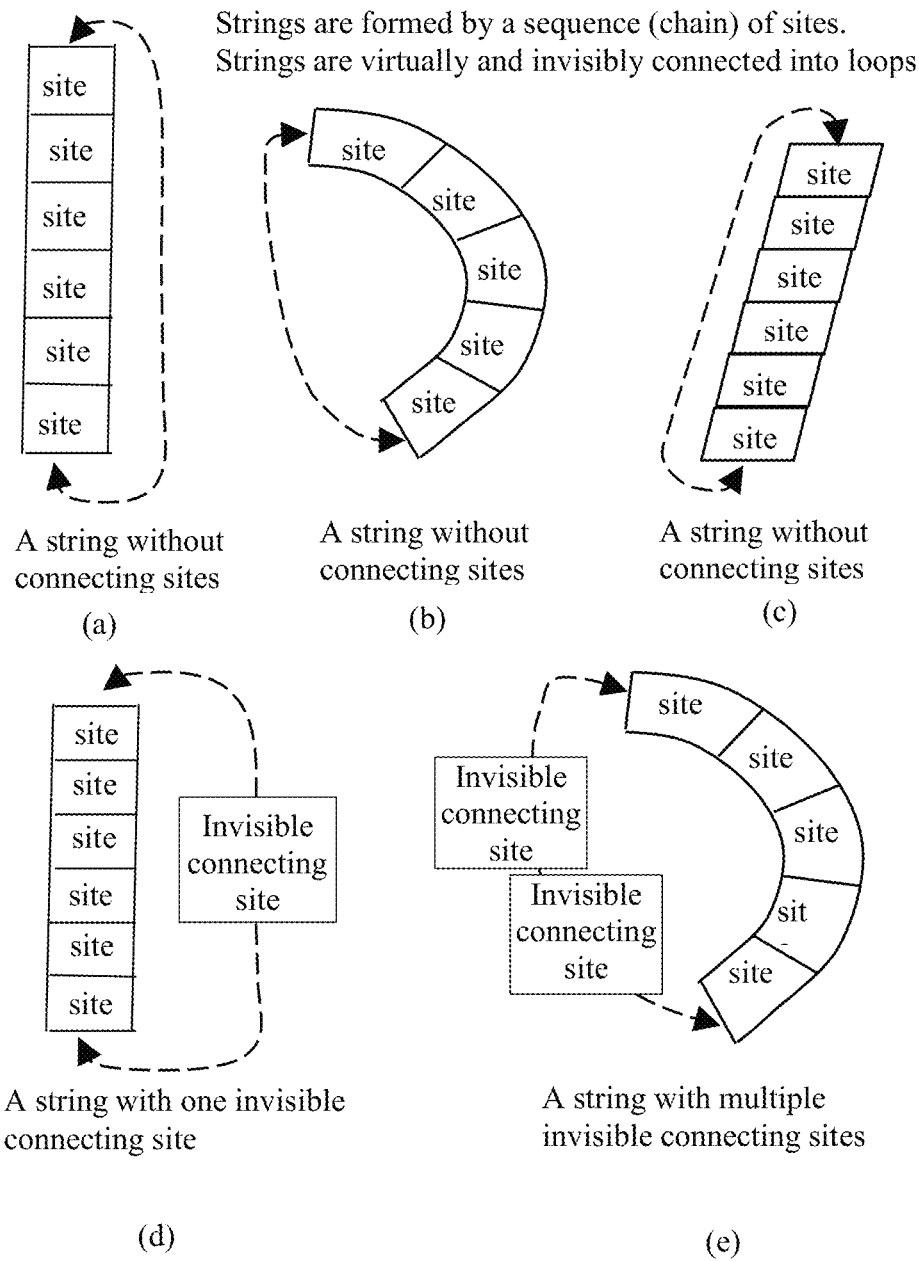
FIG. 2: Examples of strings with and without connecting sites—(a, b, c) a string of arbitrary shape without invisible connecting sites; (d) a string with one invisible connecting site; (e) a string with multiple invisible connecting sites
Figure 3:
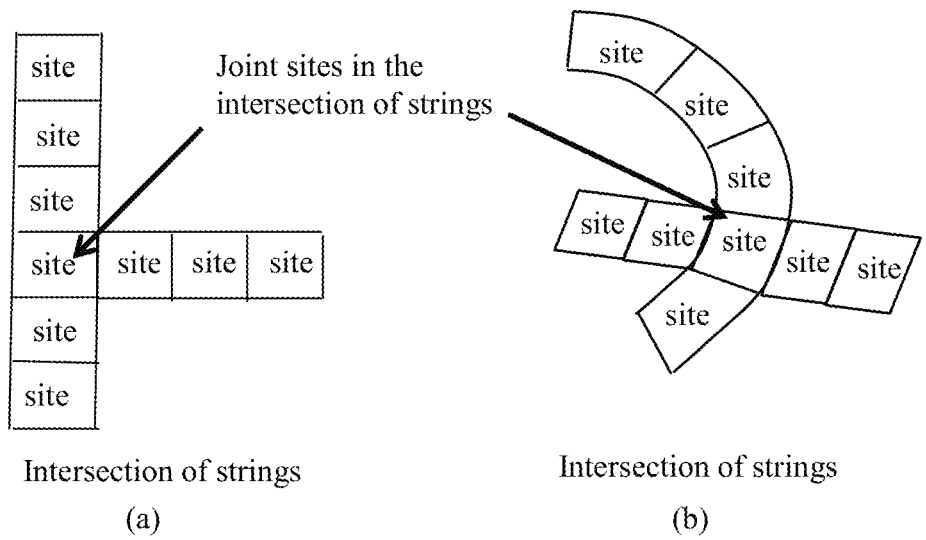
FIG. 3: Examples of joint sites in the intersection of strings.
Figure 4:
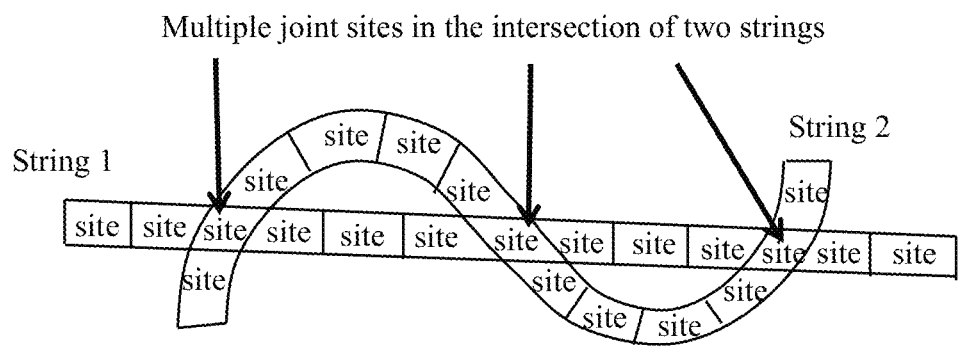
FIG. 4: Examples of joint sites in multiple intersections of strings.
Figure 5:
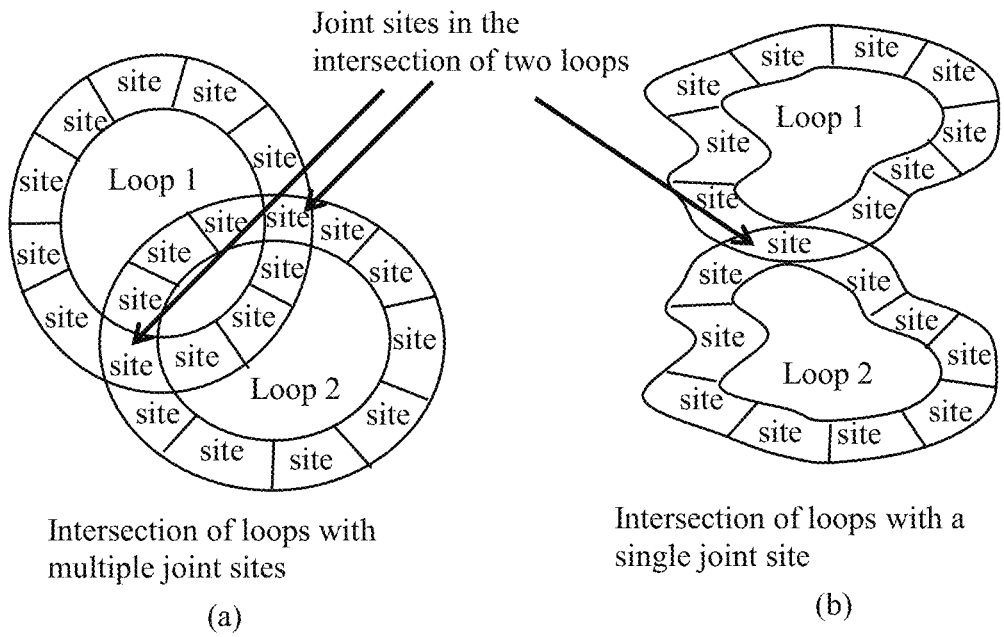
FIG. 5: Examples of joint sites in the intersection of loops.
Figure 6:
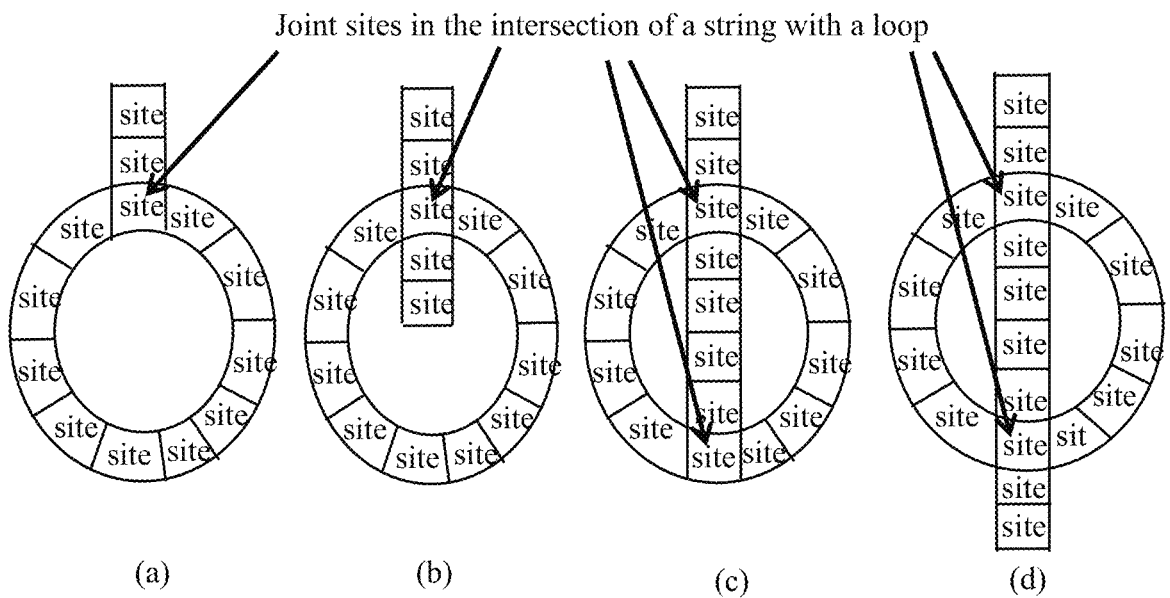
FIG. 6: Examples of the intersection of a loop and a string and the respective joint sites.

The sliding loop game with move constraints is played on a playing field displayed on a monitor or presented on a mechanical device. The playing field is formed by a loop or loops as illustrated in FIG. 1, a string or stings as illustrated in FIG. 2 or a combination of loops and strings as illustrated in the examples shown in FIGS. 3 through 6. Each loop consists of a sequence of sites and the entire sequence is self-connected into a loop as illustrated in FIG. 1. Each string consists of a sequence of sites and the entire string is open at both ends as illustrated in FIG. 2. However, an end-site at one end of a string is invisibly connected through another dimension through invisible connecting sites to the end-site at the other end of the same string, virtually and invisibly forming a logical loop as illustrated in FIG. 2. The number of invisible connecting sites varies from zero (FIG. 2(*a, b, c*)), one (FIG. 2(*d*)) to many (FIG. 2(*e*)). Invisible connecting sites do not belong to the playing field. Strings and loops intersect with some other strings and loops in the playing field forming a connected playing field. The joint sites are the sites, which are located in the intersection of strings, loops, or a string with a loop in the playing field as illustrated in FIGS. 3 through 6. Each joint site simultaneously belongs to all strings and loops, in which intersection it is located.

Game Objects

Figure 7:
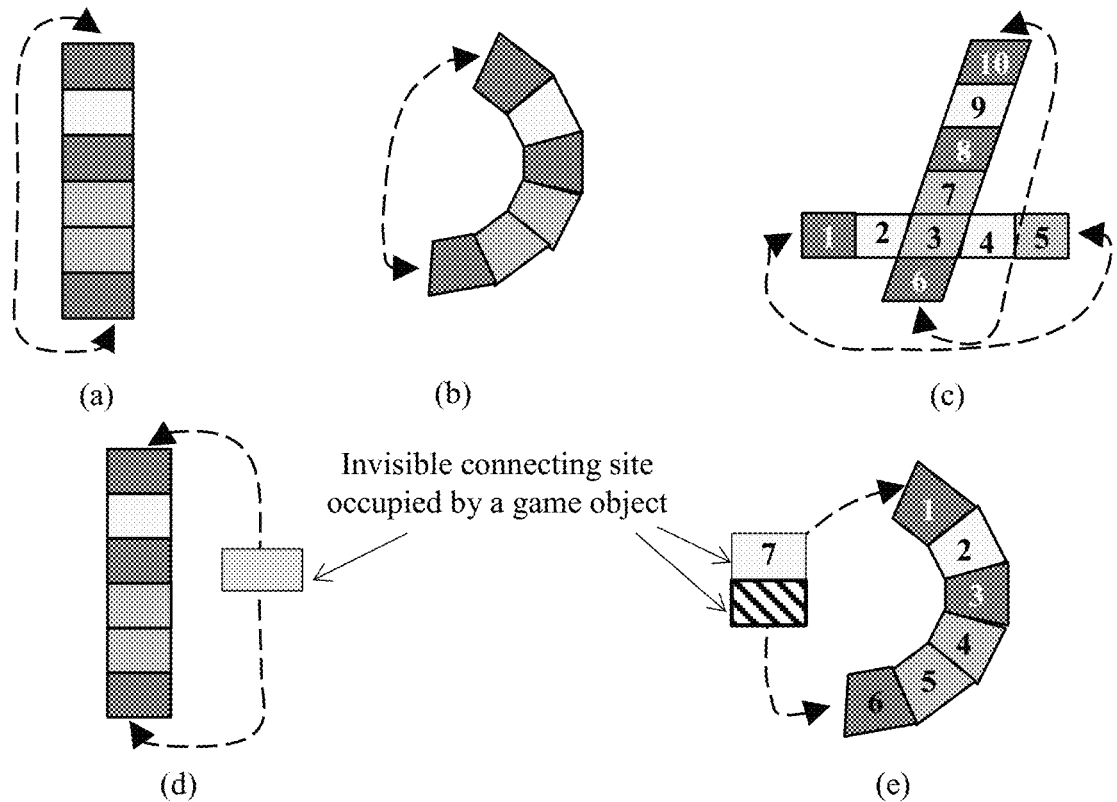
FIG. 7: Examples of game objects occupying sites in strings—(a) game objects occupying a string without invisible connecting sites and marked with color; (b) game objects occupying a string without invisible connecting sites, marked with color, and adjusting their shape to the shape of the respective sites; (c) game objects occupying two intersecting strings without invisible connecting sites, both without invisible connecting sites, marked with color and number, and adjusting their shapes to the shapes of the occupied sites; (d) game objects occupying a string with one invisible connecting site and marked with color; (e) game objects occupying a string with two invisible connecting sites and marked by color, pattern, and number.
Figure 8:
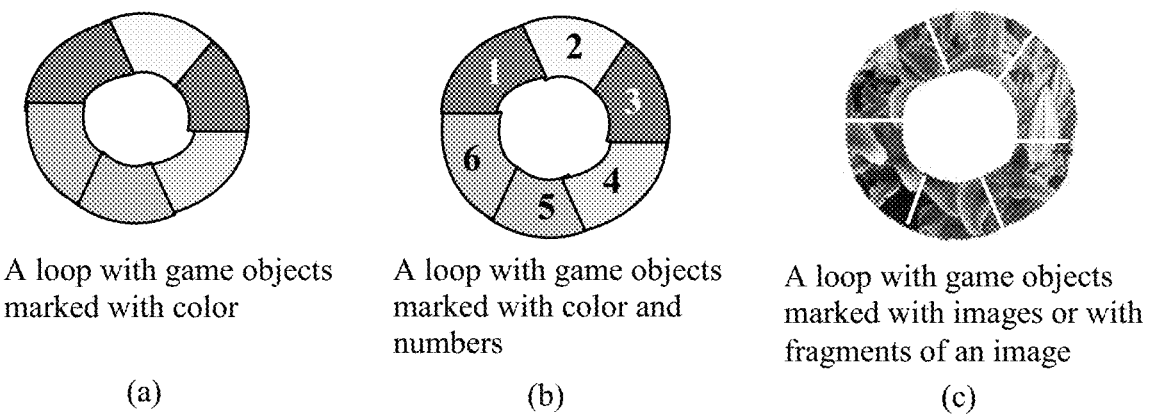
FIG. 8: Examples of game objects occupying sites in a loop, adjusting their shape and size to the shape of size of the corresponding sites, and marked with (a) colors, (b) numbers, and (c) images.

Each site in each string and in each loop, including all joint sites, in the playing field and invisible connecting sites, is occupied by a game object, one game object per each site. Each game object is marked either with color, colors, or pattern as illustrated in FIGS. 7(*a, b, d*) and FIG. 8(*a*) or with a number or numbers as illustrated in FIG. 7(*c, e*), FIG. 8(*b*), and FIG. 9(*a*), or with an image or a fraction of an image as illustrated in FIG. 8(*c*) and FIG. 9(*b*), or with a combination or a mix of all above. Some game objects in different sites are marked differently and some game objects are marked identically. The game objects, which are marked identically, are considered identical.

Figure 9:
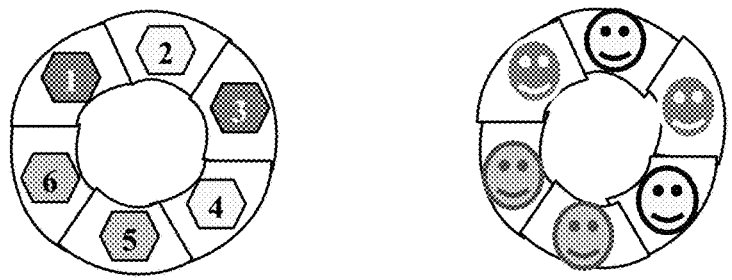
FIG. 9: Examples of game objects that keep their original shape and size regardless of the shape and size of the corresponding sites and marked with (a) colors-numbers and (b) images.

Game objects adjust their shape and size to the shape and size of the occupied sites as illustrated in FIGS. 7 and 8 or some game objects keep their own shape and size regardless of the shape and size of the occupied site as illustrated in FIG. 9.

Playing Field

The playing field of the sliding loop game is composed of a combination of intersecting strings and loops forming a connected geometric structure. Invisible connecting sites in strings are not included in the playing field.

Figure 10:
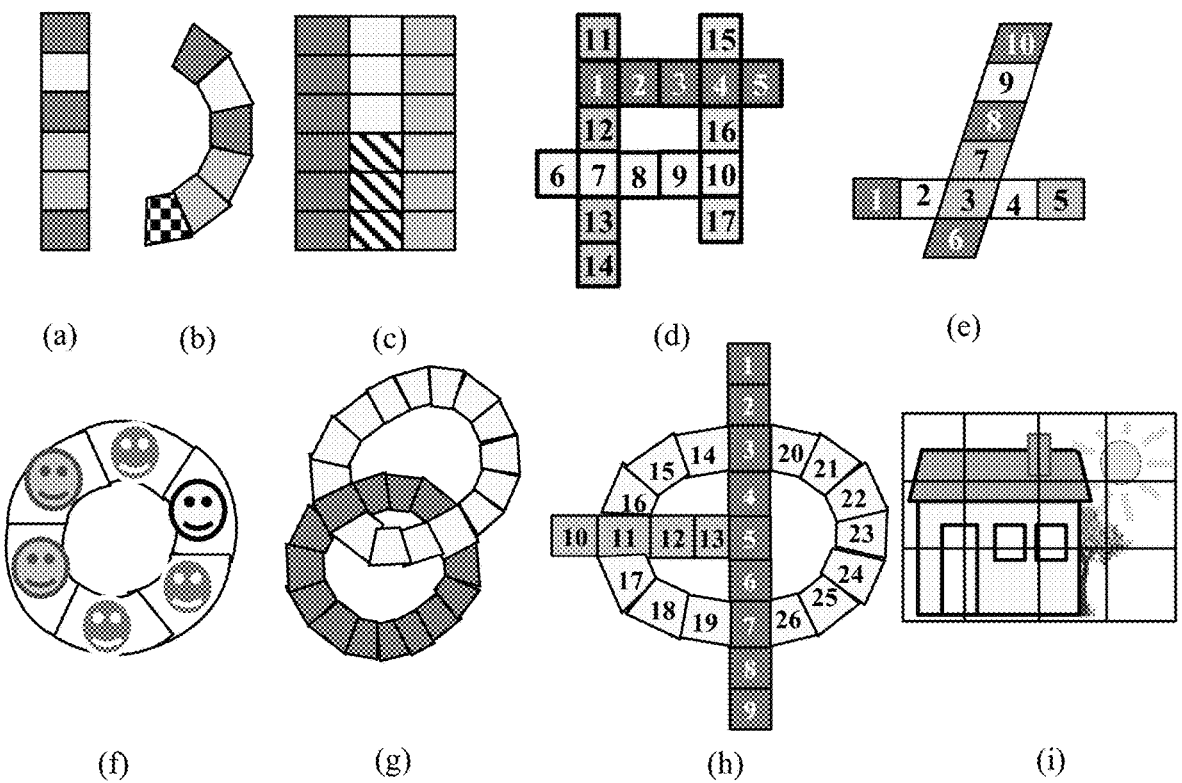
FIG. 10: Examples of plurality of playing fields populated by various game objects; (a, b) a single string; (c) a rectangular playing field composed of three vertical and six horizontal strings; (d) a combination of two horizontal and two vertical strings; (e) a combination of two strings; (f) a single loop; (g) two intersecting loops; (h) two strings and a loop; (i) a rectangular playing field composed of four vertical and three horizontal strings.

Examples of the playing field with game objects, which is composed of a single string or a single loop, are illustrated in FIG. 10(*a, b, f*). Examples of the playing field, which is composed of a combination of strings, are illustrated in FIG. 10(*c, d, e, i*). An example of the playing field, which is composed of a single loop, is shown in FIG. 10(*f*) and a combination of loops is illustrated in FIG. 10(*g*). An example of the playing field, which is composed of a combination of strings and loops, is illustrated in FIG. 10(*h*).

For example, a rectangular playing field shown in FIG. 10(*c*) is a composition of six horizontal strings and three vertical strings and each site is a joint site in the intersection of a vertical and a horizontal string. The sites in the playing fields shown in FIG. 10(*a, b, c, g*) are occupied with the game objects marked with a color or a pattern. The sites in the playing fields shown in FIG. 10(*d, e, h*) are occupied with the game objects marked with numbers and colors. The sites in the playing fields shown in FIG. 10(*f*) are occupied with game objects marked with images and color, and the sites in the playing fields shown in FIG. 10(*i*) are occupied with game objects marked with fragments of an image.

Game Moves

Figure 11:
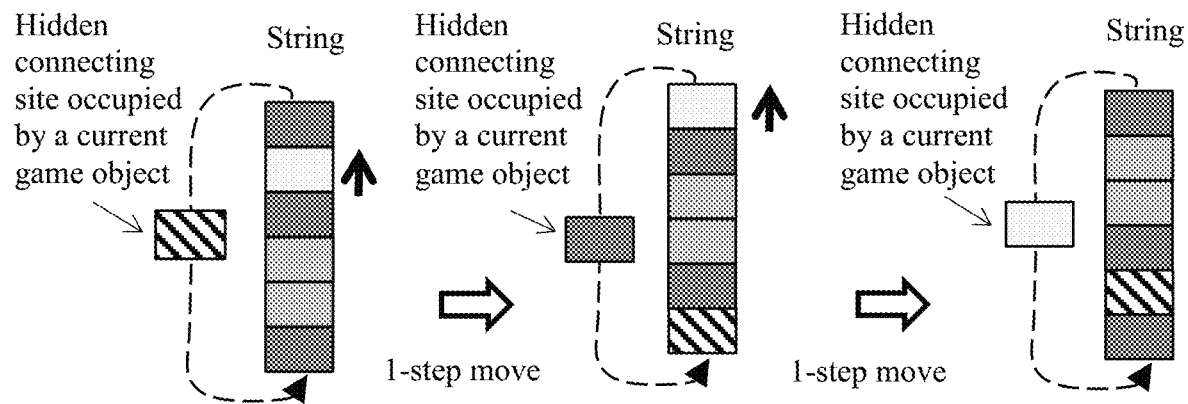
FIG. 11: Series of 1-step moves of the game objects in a string with one hidden connecting site to illustrate how the game objects move in the string as a whole group.
Figure 12:
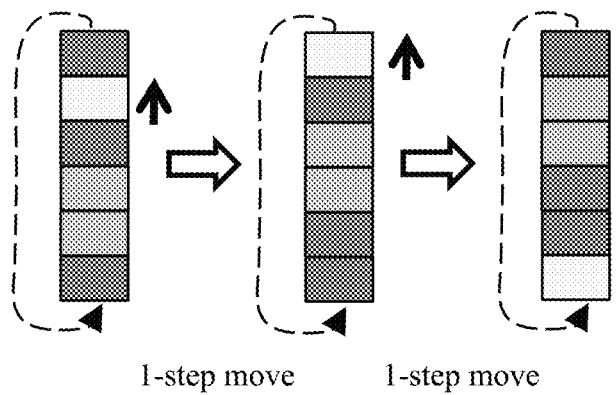
FIG. 12: Series of 1-step moves of the game objects in a string without hidden connecting sites to illustrate how the game objects move in the string and in the hidden connecting sites of the respective string as a whole group.
Figure 13:
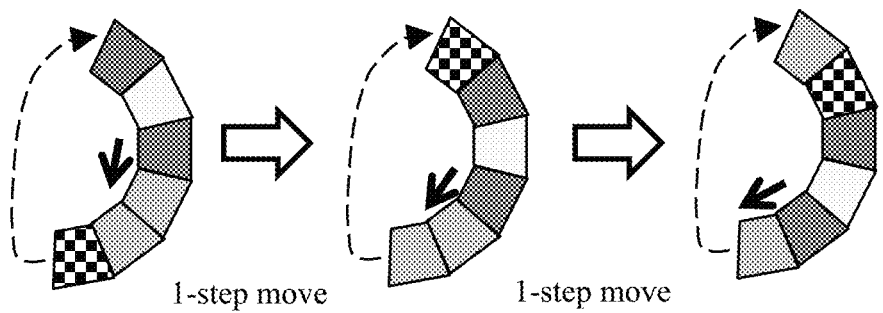
FIG. 13: Series of 1-step moves of the game objects in a curved string without hidden connecting sites. The game objects move in the string as a whole group of game objects.
Figure 14:
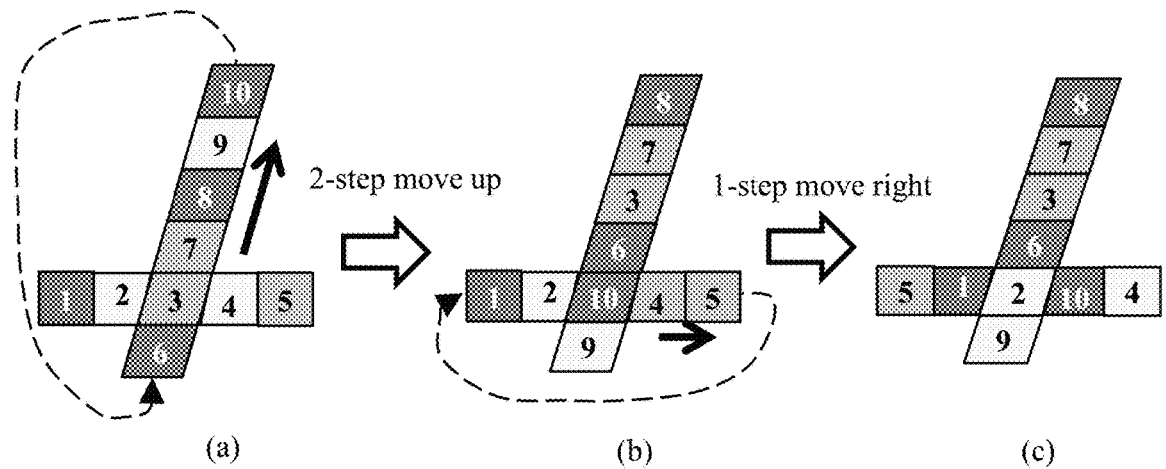
FIG. 14: Series of game object moves in the intersecting strings without hidden connecting sites—(a) is the first 2-step upward move in the vertical string, (b) the second 1-step right move in the horizontal string, and (c) is the configuration of the game objects after the second move.
Figure 15:
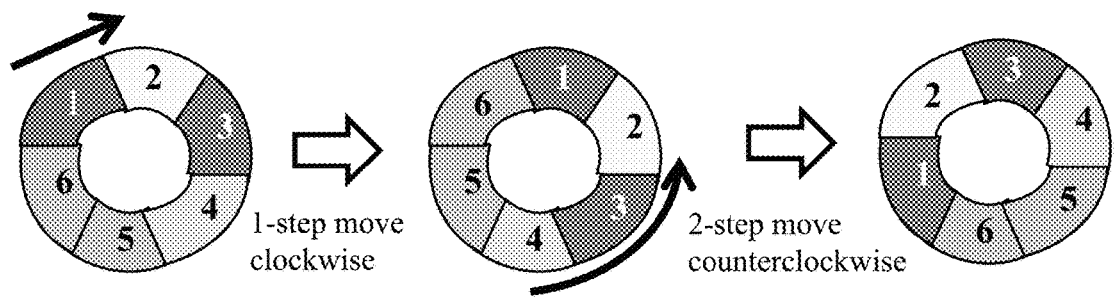
FIG. 15: Series of game objects moves in a loop.
Figure 16:
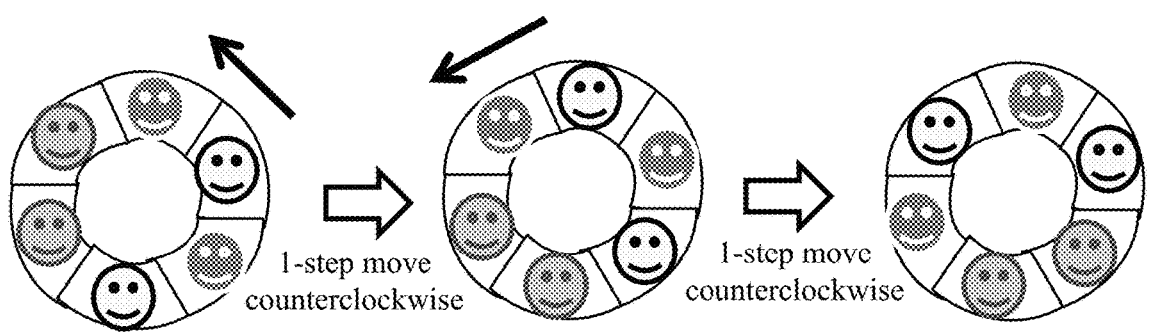
FIG. 16: Series of game objects moves counterclockwise in a loop.
Figure 17:
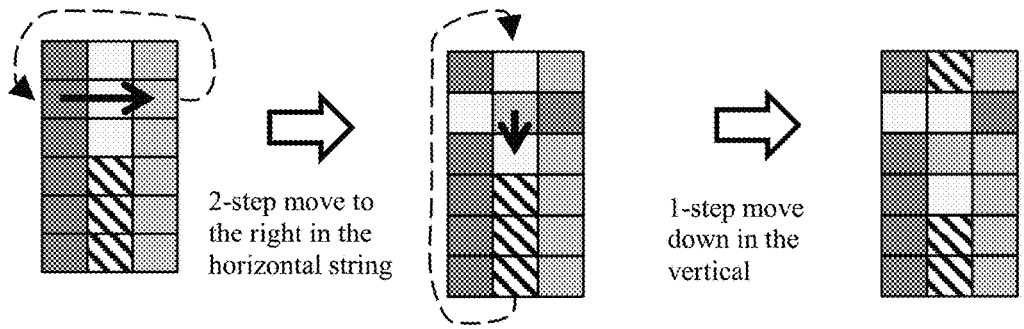
FIG. 17: Series of game object moves in a rectangular playing field, where each column and each row is a string without hidden connecting sites.
Figure 18:
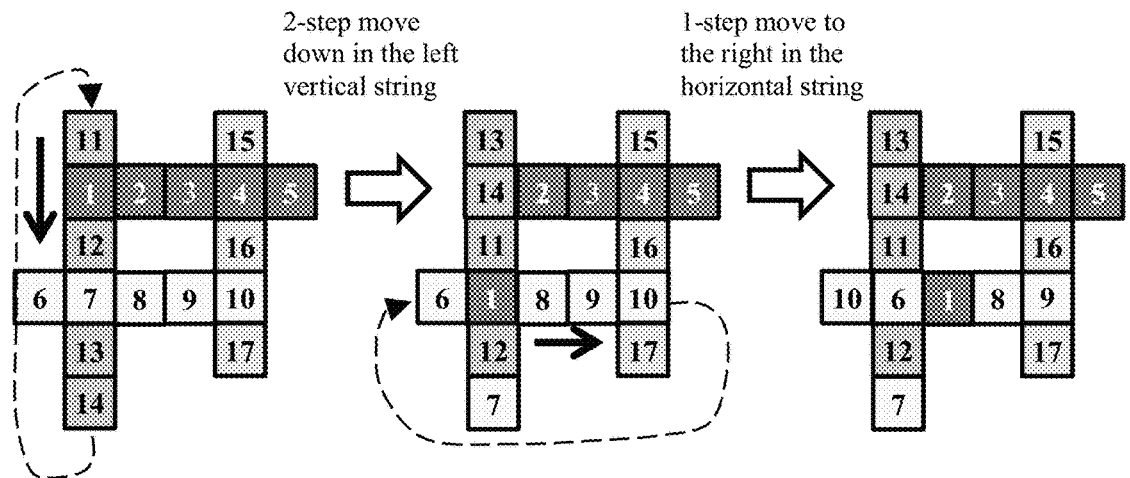
FIG. 18: Series of game object moves in a playing field composed of intersecting strings without hidden connecting sites.
Figure 19:
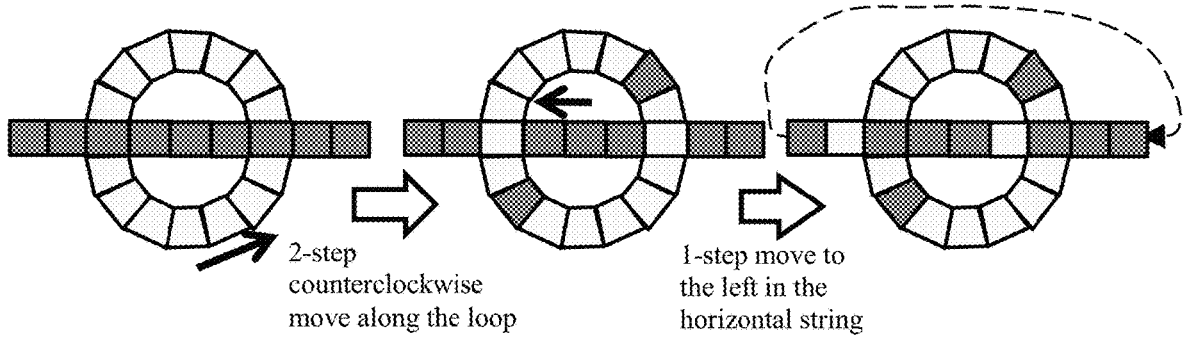
FIG. 19: Series of moves of game objects in a playing field composed by intersecting loop and string. The first move is a 2-step counterclockwise move in the loop and the second is a 1-step left move in the string.
Figure 20:
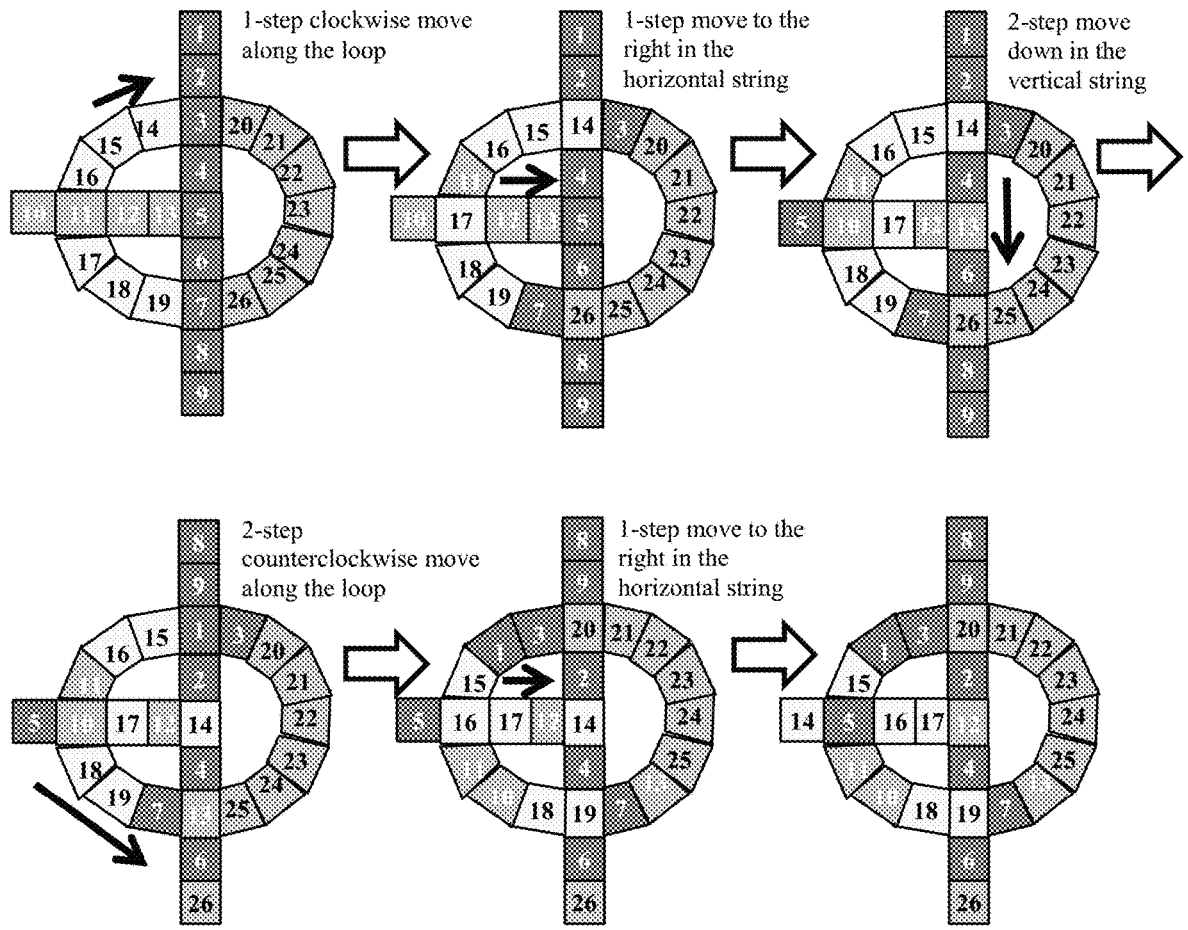
FIG. 20: Series of moves of game objects in a playing field composed of two strings without hidden intersecting sites and a loop.
Figure 21:
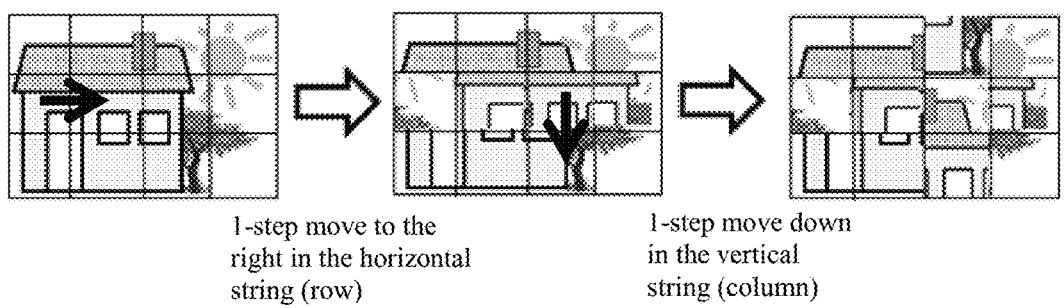
FIG. 21: Series of moves of game objects marked with images in a rectangular playing field where each column and row is a string without hidden connecting sites.

Game objects in a string or a loop are movable as a whole group along the string or the loop on which they are located. The player selects and moves a game object on the playing field by placing the cursor over the game object or by touching the game object on the touch screen, or by any other way. The selected game object is movable along the string or the loop, to which the game object belongs. If the game object is located in a joint site, i.e. on the site in the intersection of strings or loops, or a string with a loop, the game object is movable along any string or loop to which the joint site (the site in the intersection) belongs, if no move constraints are imposed. All game objects located in the respective loop or string move simultaneously as a whole group with all selected game object in the respective string or loop as illustrated in FIGS. 11 through 21. If a selected game object moves along a loop, the entire group of the game objects in the sites of that loop circularly moves along the sites in the loop as illustrated in FIGS. 15, 16, 19, and 20. If a selected game object moves along a string, the entire group of game objects located in the sites in that string, including the invisible connecting sites (FIG. 2(*d, e*)), moves along the respective sites in the string as in a virtual loop as shown in FIGS. 11, 12, 13, 14, 17, 18, 19, 20, and 21. The game object, which leaves the string from one end-site in the string enters the string from the other end by appearing in the end-site at the other end of the string in a number of move steps equal the number of the invisible connecting sites in the respective string as illustrated in FIG. 11.

Master Objects and Constrained Moves

Figure 22:
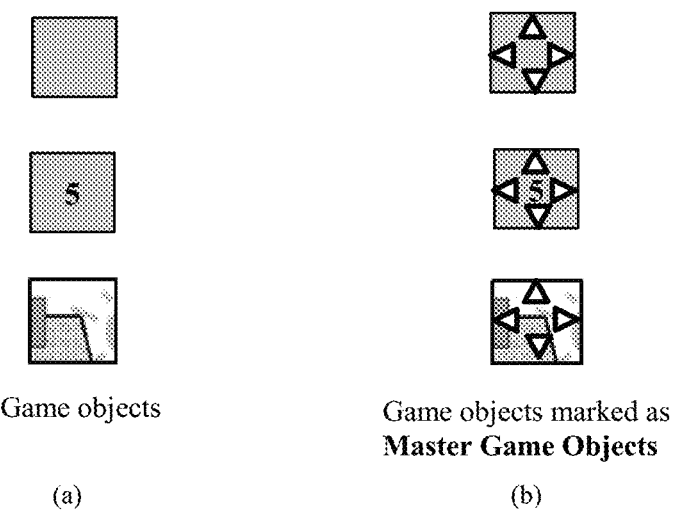
FIG. 22: Examples of (a) game objects marked with color, number, and a fragment of an image, respectively and (b) similar but specially marked master game objects for the move-constrained sliding game.
Figure 23:
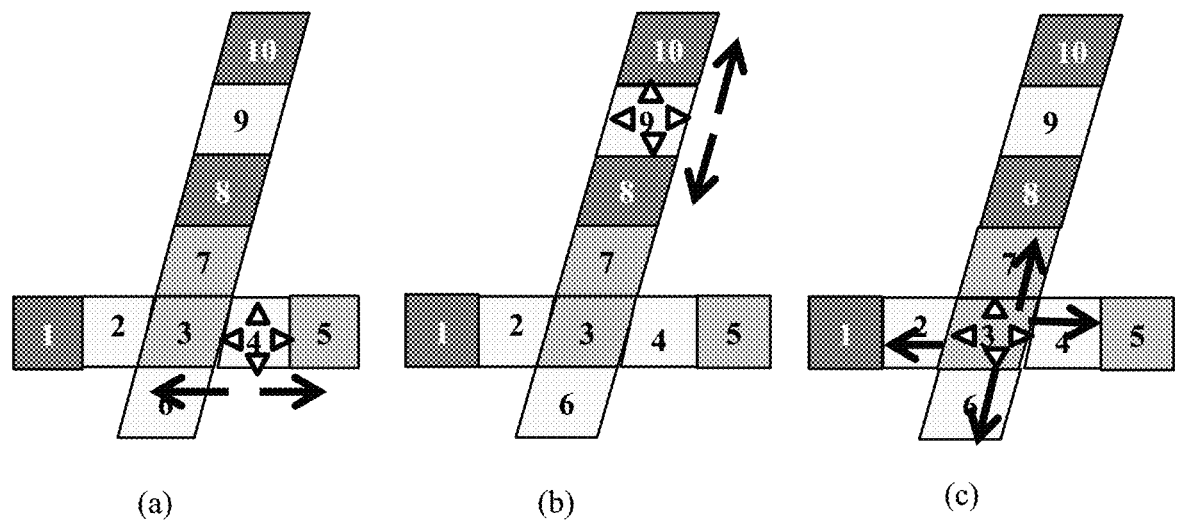
FIG. 23: Examples of the allowed moves in a move-constrained game with master game objects; (a) master game object "4" is located in the horizontal string and allows a horizontal move in that string, (b) master game object "9" is located in a vertical string and allows a vertical move in that string, and (c) master game object "3" is located in the joint site in the intersection of two strings and allows a move along either string.
Figure 24:
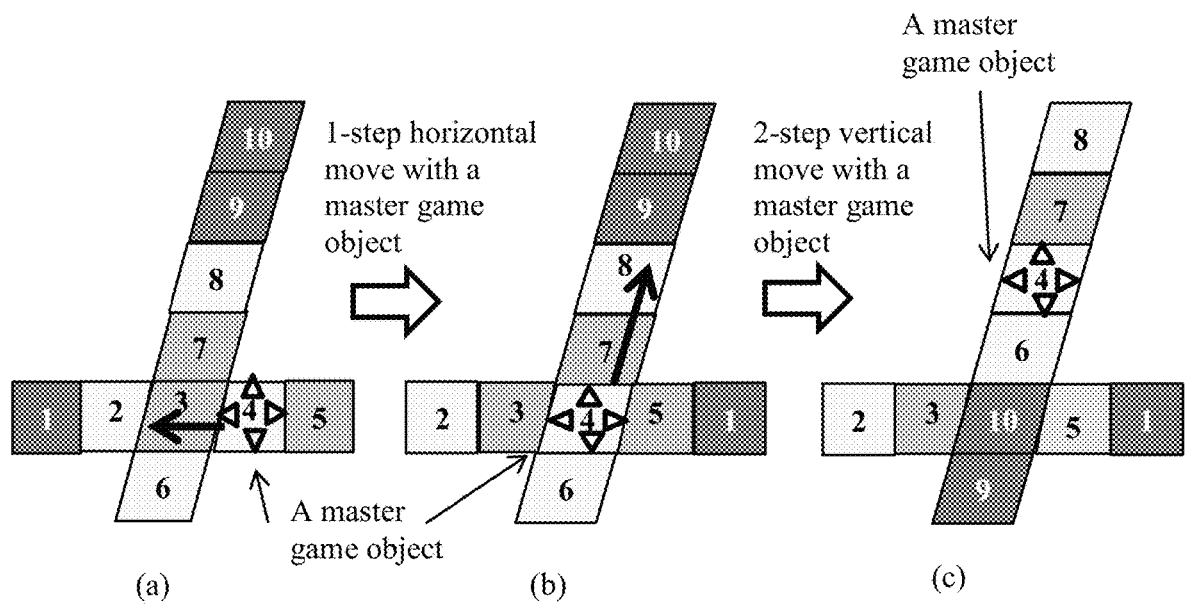
FIG. 24: Series of allowed moves in a move-constrained game with master game object "4"; (a) the master game object is located in the horizontal string and allows a horizontal move in that string and a 1-step left horizontal move is performed; (b) after the move, the master game object is located in the joint site in the intersection of the strings and allows a move along either string and a 2-step upward move is performed; and (c) the final configuration of the game objects in the playing field after those two moves.
Figure 25:
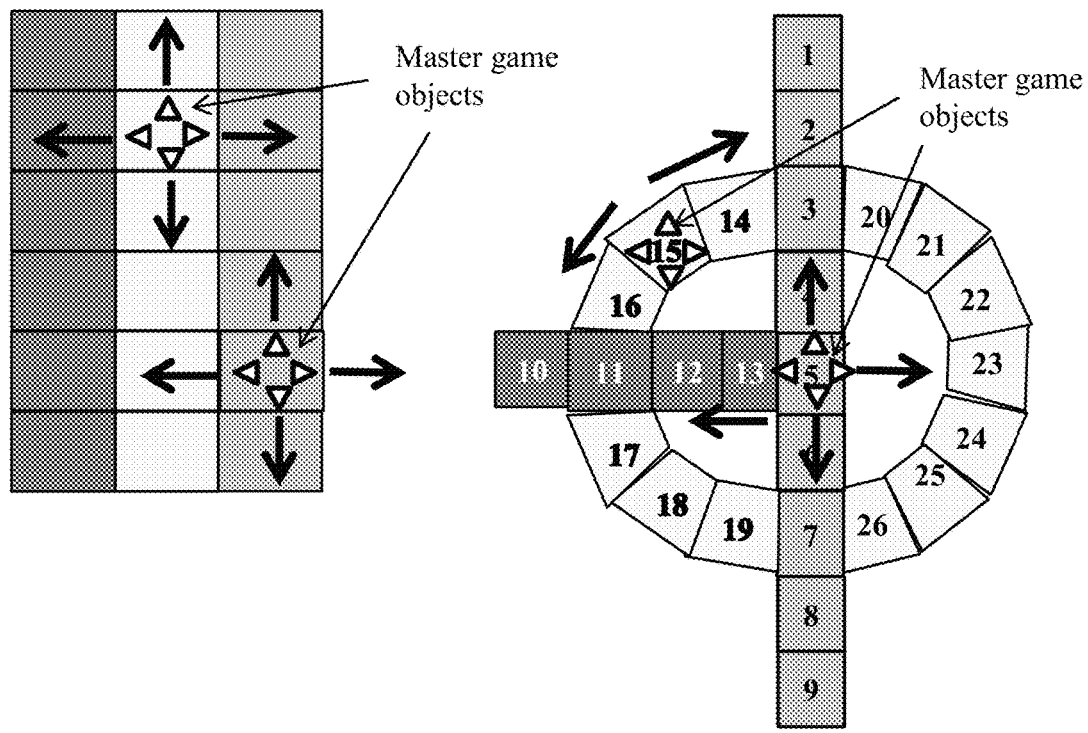
FIG. 25: In a move-constrained game, moves are allowed only with master game objects.
Figure 26:
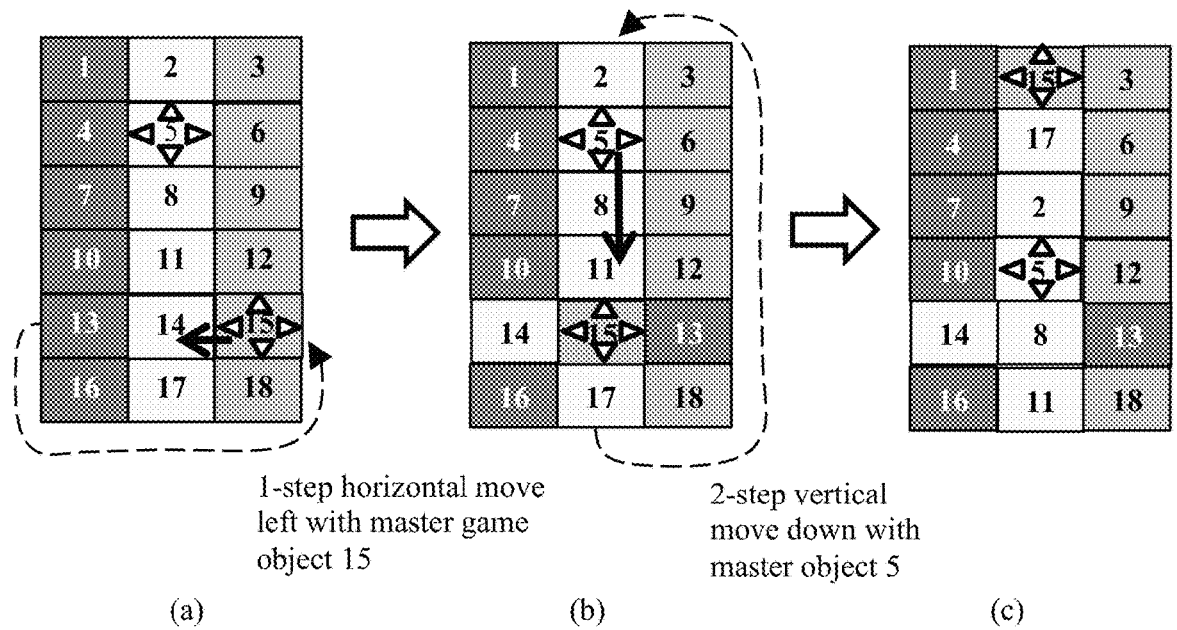
FIG. 26: Series of allowed moves in a move-constrained game with two master game objects "5" and "15" in a rectangular playing field; (a) the first 1-step left horizontal move was performed with master game object "15", (b) the second 2-step downward move was performed with master game object "5", and (c) is the resulting configuration in the playing field after those two moves.
Figure 27:
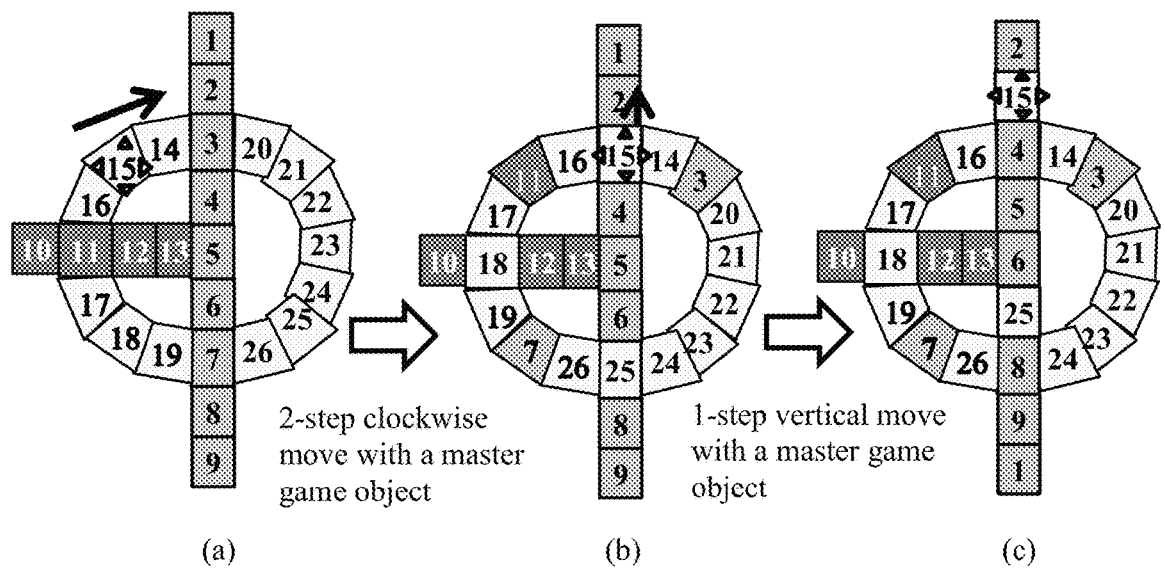
FIG. 27: Series of allowed moves in a move-constrained game with one master game object "15" in the playing field composed of a loop and two strings; (a) master game object is located in the loop and allow a move along the loop, and a 2-step clockwise move is performed; (b) in the resulting configuration, master game object "15" is located in a joint site in the intersection of the loop and a string that allows the next move either long the loop or along the string, and 1-step move is performed upward along the string; and (c) is the final configuration of the game objects in the playing field after those two moves.

In the sliding loop game with move constraints, some game objects in the playing field are specially marked as master game objects as illustrated in FIG. 22(*b*). The game objects are movable along a string or a loop in the playing field only, if the respective string or loop contains at least one master game object. This defines a move constraint.

Figure 28:
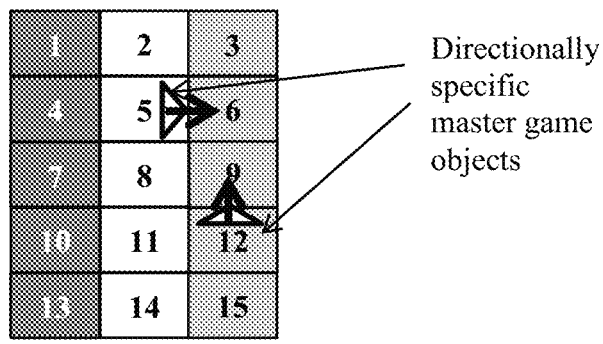
FIG. 28: Directionally constrained master game objects "5" and "12". Master game object "5" allows only a right move in the horizontal string "4-5-6" and master game object "12" allows only an upward move in the vertical string "3-6-9-12-15".

Moves of the games objects in the sliding loop game with move constraints are illustrated in FIGS. 23 through 27. These figures illustrate the constrained moves with unrestricted directions, where master game objects are allowed to move along a loop or a string to which they belong. FIG. 28 illustrates the constrained moves with restricted directions, where master game objects are marked for moves in a specified direction along the loop or string to which they belong. Each directionally restricted master game object is movable only in the specified direction, which is marked on this particular master game object. For example, master game object "5" in FIG. 28 is movable only to the right along string "4-5-6", though it is located in the joint site in the intersection of vertical string "2-5-8-11-14" and horizontal string "4-5-6". Master game object "12" in the same figure is movable only upward along string "3-6-9-12-15" though this master game object occupies the joint site in the intersection of strings "3-6-9-12-15" and "10-11-12".

In some settings of the game, all game objects are master objects, thus master game objects in that game do not need to be specially marked as master game objects.

The Goal of the Game

A specified configuration of the game objects on the playing field constitutes the target configuration of the game objects in that playing field.

The initial configuration of the game objects in the playing field is set to be different from the target configuration. The initial configuration is set by a number of hidden moves from the target configuration, or by random initial positioning of the game objects on the playing field, or manually, or by any other way, which perturbs the target configuration.

The goal of the game is to restore the target configuration of the game objects in the playing field by performing a series of moves of the game objects according to the rules described above.

The player performance in the game is measured by either the least number of moves or by the shortest time used to restore the target configuration, or by their combination, or by any other score-forming parameter or parameters.

Hints

Figure 29:
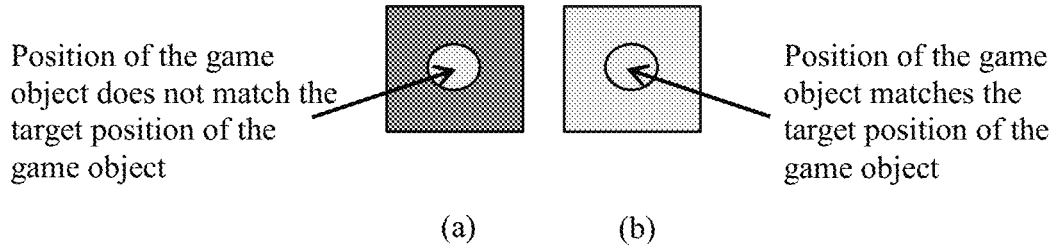
FIG. 29: Example of a location hint placed on a site in the playing field that indicates whether current position of a game object matches the target position of that game object; (a) the current position of the game object on this site does not match the target position in the playing field and (b) the current position of the game object matches the target position in the playing field.
Figure 30:
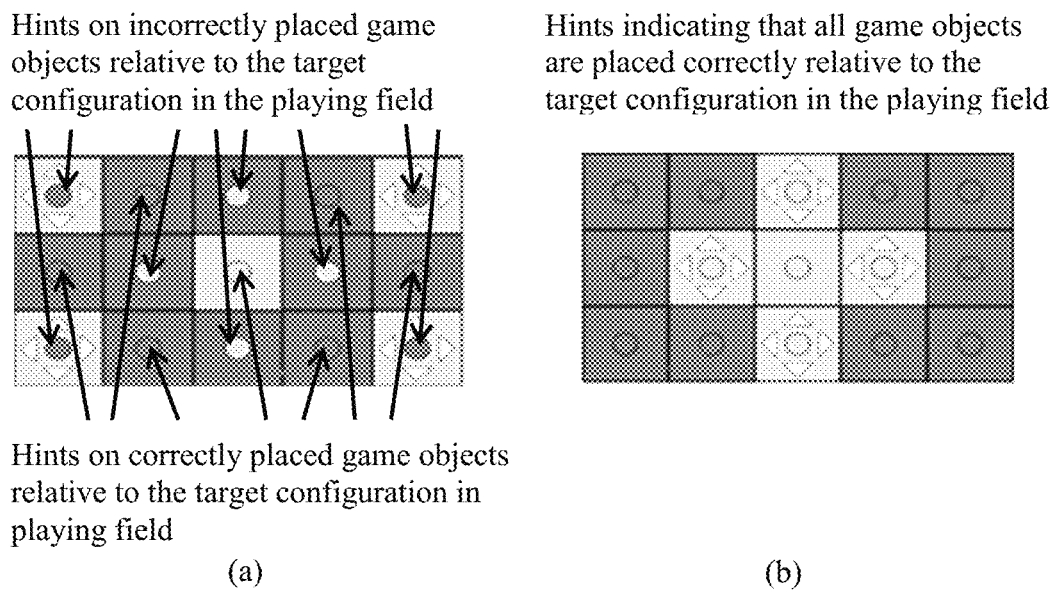
FIG. 30: Location hints placed on the sites in the playing field to show whether the game objects are correctly placed in the matching target positions in the playing field—(a) some game object are placed in the matching target positions but some in the not-matching positions and (b) all game objects are placed in the matching target positions in the playing field.

Subject to the game settings, hints are placed on the sites in the playing field to show whether the game objects are placed in the matching target positions (sites) on the playing field as illustrated in FIGS. 29 and 30. Those hints help the player to see the target configuration of the game objects in the playing field.

Figure 31:
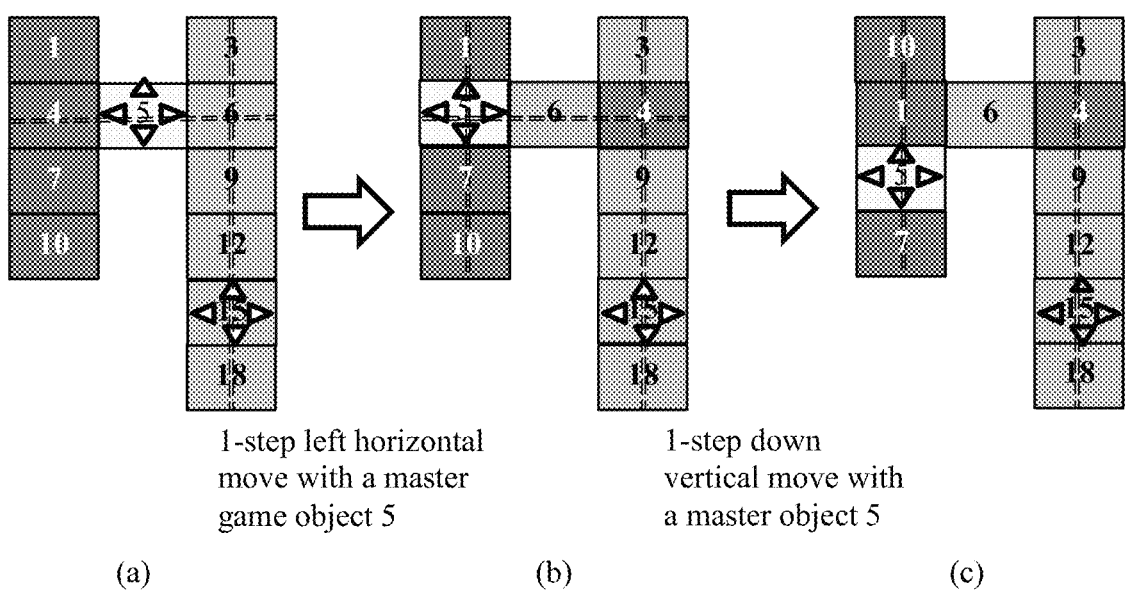
FIG. 31: Examples of the allowed move path indicators (double-dotted lines) in a move-constrained game with two master game objects "5" and "15" in the playing field composed of three strings, which provide hints on the allowed move paths determined by the current positions of the master game objects in the playing field; (a) the allowed move paths are along the horizontal string "4-5-6" and the vertical string "3-6-9-12-15-18", (b) after a 1-step left horizontal move was performed in the horizontal string "4-5-6" in the previous position, the next allowed move paths are along vertical strings "1-5-7-10", "3-4-9-12-15-18", and horizontal string "5-6-4", and (c) is the final position after a 1-step move down was performed along string "1-5-7-10" in the previous position, which resulted in the allowed move paths for the next move along two vertical strings "10-1-5-7" and "3-4-9-12-15-18". All allowed move paths for each configuration of the game objects in the playing field are shown (hinted) by double dotted lines along the respective strings.

Allowed moves in a current state of the game are determined by the current positions of the master game objects in the playing field. Hints on allowed move paths in the move-constrained games are shown on the playing field if such hints are configured. The allowed move paths depend on the constraints imposed by the positions of the master game objects in the playing field. An example of the allowed move paths hints are illustrated in FIG. 31. The hints on the allowed move paths are shown in the figure as the double-dotted lines along the possible move paths. Such allowed move paths are determined by current positions of the master game objects and possibly change after any move as illustrated in FIG. 31 (*a, b, c*).

Game Complexity

Different configurations of the sliding loop game with move constraints offer a variety of playing fields and types of game objects, including master objects, to present a wide spectrum of complexities from a very simple and easy game through a very complex game.

We claim:

1. A sliding loop game with motion constraints, comprising:
   (a) a playing field that consists of a combination of strings and loops of plurality of shapes, which intersect with other strings and loops, forming by such a connected geometric structure;
   (b) each loop is a self-connected chain of sites without beginning and end;
   (c) each string is a chain of sites with two ends, which forms an implicit virtual loop, wherein an end-site at one end of the string is virtually connected to the end-site at the other end of the same string via an additional dimension by an additional or no additional subchain of sites invisible to the player, referred to as invisible connecting sites;
   (d) a joint site is a site located in the intersection of a loop or a string with another loop or string, and the joint site belongs to all loops and strings, in which intersection the joint site is located;
   (e) each site in each loop and each string, as well as each invisible connecting site is occupied by a certain game object;
   (f) each game object is marked with a color, colors, pattern, character or characters, number or numbers, image, images, or fraction of an image, or any other marks identifying the game object, wherein, if some game objects are identically marked, they are considered identical;
   (g) game objects in a loop or in a string are movable along the sites in the respective loop or string including the invisible connecting sites in the string as a whole group of all game objects, which occupy all sites in the respective loop or string including the invisible connecting sites in the string, wherein producing cycling movement, whereas the game object, which is leaving a string from one end-site of a string, reappears in the end-site at the other end of the string in a number of steps equal to the number of invisible connecting sites in that string, because the both ends of the string are virtually connected in a loop; and
   (h) a game object that occupies a joint site is movable along any string or loop, in the intersection of which the joint site is located.

2. In the game of claim 1, wherein with move constraints
   (a) the game objects are movable along the sites in a loop or a string only, if the respective string or loop contains at least one specially marked game object, which is referred to as a master game object; and
   (b) the game objects are movable only in a specified direction along the sites in a loop or a string, if the master game objects in the respective string or loop are specially marked to allow moves in a that specified direction.

3. In the game of claim 1, wherein
   (a) hints for target positions of the game objects in the playing field of the current game are shown on the sites in the playing field; and
   (b) hints for hidden connecting sites are shown to the player.

4. In the game of claim 2, wherein hints for the allowed moves and their directions for the master game objects are shown in the strings and loops for the current positions of the master game objects in the playing field.

* * * * *